United States Patent Office 3,004,925
Patented Oct. 17, 1961

---

3,004,925
CORROSION INHIBITION
Robert J. Burch, North Plainfield, and George Davidowich, Bayonne, N.J., assignors to Air Reduction Company, Incorporated, New York, N.Y., a corporation of New York
No Drawing. Filed Mar. 18, 1959, Ser. No. 800,118
6 Claims. (Cl. 252—396)

This invention relates to the inhibition of metal corrosion in corrosive aqueous solutions by the addition thereto of corrosion inhibiting amounts of ethylene oxide adducts of acetylenic glycols and carbinols and mixtures thereof. The invention includes the inhibition of corrosion in aqueous solutions containing high concentrations of acids, bases, and salts.

The ethylene oxide adducts of the acetylenic glycols which can be used as corrosion inhibitors according to this invention can be structurally represented by the formula

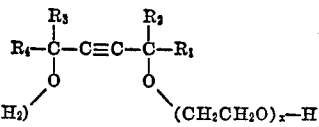

in which $R_1$, $R_2$, $R_3$, and $R_4$ are members selected from the group consisting of alkyl, cycloalkyl, aryl, and aralkyl radicals and hydrogen and where $R_1$, $R_2$, $R_3$, and $R_4$ contain a total of at least seven carbon atoms, and $x$ and $y$ integers totaling an average of between 3 and 25.

The ethylene oxide adducts of the acetylenic carbinols which can be used as corrosion inhibitors according to this invention can be structurally represented by the formula

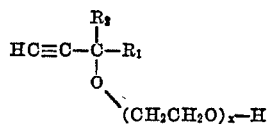

in which $R_1$ and $R_2$ are members selected from the group consisting of alkyl, cycloalkyl, aryl and aralkyl radicals and hydrogen and where $R_1$ and $R_2$ contain a total of at least three carbon atoms, and $x$ is an integer averaging between 3 and 30.

The parent acetylenic glycols which can be condensed with ethylene oxide correspond to the general formula

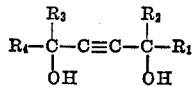

in which $R_1$, $R_2$, $R_3$, and $R_4$ are members selected from the group consisting of alkyl, cycloalkyl, aryl, and aralkyl radicals and hydrogen where $R_1$, $R_2$, $R_3$, or $R_4$ contain a total of at least seven carbon atoms. The acetylenic glycols can be symmetrical where $R_1$ is the same as $R_4$, and $R_2$ is the same as $R_3$ or unsymmetrical.

The acetylenic carbinols which can be condensed with ethylene oxide also correspond to the general formula

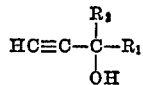

in which $R_1$ and $R_2$ are members selected from the group consisting of alkyl radicals, cycloalkyl radicals, aryl radicals, and aralkyl radicals and hydrogen and where $R_1$ and $R_2$ contain a total of at least three carbon atoms.

The acetylenic glycols and carbinols can be prepared in various known manners such as those described in the United States patents to Bruson et al., No. 2,250,455; Kreimeir, No. 2,106,180; and Vaughn, No. 2,163,720.

It is advantageous to form the adducts directly from the reaction mixture to form mixed adducts and thus avoid separation procedures where the properties of the pure glycol or carbinol adducts are not desired. Various concentrations of mixed adducts can be formed by forming a mixture from pure adducts in the desired concentration.

Various basic catalysts can be used to promote the reaction between the ethylene oxide and the acetylenic glycols and carbinols including sodium hydroxide, potassium hydroxide, and N,N-dimethyl aniline. Aliphatic amines such as triethylamine, trimethylamine, tripropylamine, and the like are particularly advantageous catalysts. Such aliphatic amines catalyze the condensation reaction at a rapid rate at moderately low temperature and pressure without inducing cleavage of the acetylenic glycol or carbinol.

The use of strongly basic catalysts such as sodium hydroxide, especially at high temperatures of about 150° C., induces cleavage of the acetylenic glycols and carbinols reversing the reaction reforming acetylene and the corresponding ketone used to form the glycol or carbinol, and for this reason should be avoided when operating at high temperatures. Such strong basic catalysts can be used at lower temperatures of about 50 to 75° C., but some undesirable cleavage still occurs. Catalysts of weak basicity such as N,N-dimethyl aniline are not sufficiently basic to promote the reaction at a reasonable rate and require the use of higher temperatures and pressures. The aliphatic amines are particularly suited to promote the reaction between the ethylene oxide and the acetylenic glycols and carbinols and possess none of the disadvantages of the other catalyst discussed above.

Once the hydroxy groups of the acetylenic glycol and carbinol have reacted with ethylene oxide, the resultant adduct exhibits the marked stability of an ether and can be heated with a concentrated base such as sodium hydroxide at elevated temperatures while comparable treatment of the initial acetylenic glycol results in extensive degradation. Consequently, strongly basic catalysts, such as the alkali metal hydroxides, can be used to increase the polyoxyethylene chain length once the initial adducts have been formed and protected against decomposition.

At the onset of the condensation reaction, the electronegativity of the acetylenic bond in the glycols and carbinols markedly increases the reactivity of the acetylenic glycols and carbinols toward ethylene oxide. Such acetylenic glycols as 4,7-dimethyl-5-decyne-4,7-diol and 2,4,7,9-tetramethyl-5-decyne-4,7-diol react readily with ethylene oxide at atmospheric presure and moderate temperatures, using tetraethylamine as a catalyst.

Using a catalyst of moderate basicity and which does not favor the reverse reaction, the ethylene oxide adduct of the acetylenic glycol can be formed at either atmospheric or moderate to low pressures. The use of moderate to low pressures is preferred since it obviates the necessity of recycling unreacted ethylene oxide and generally proceeds at faster rates than condensations carried out at atmospheric pressures. In addition, those reactions conducted under pressure may be accomplished with ordinary efficient agitation, while reactions conducted at atmospheric pressure often work best when a dispersion-type agitator is provided.

The temperature and pressure at which the reaction is run will depend upon the particular system under reaction and the catalyst concentration. Generally, at higher catalyst concentrations the reactions can be run at lower temperatures and pressures. Most of the reactions involving the glycols can take place at moderate temperature (50–75° C.) using triethylamine as a catalyst. Some reactions require higher temperatures. For example, when forming the ethylene oxide adduct of a glycol containing more than about 14 carbon atoms, such as a mixture of 7,10-dimethyl-8-hexadecyne-7,10-diol and 3-methyl-1-nonyn-3-ol, it is advantageous to use temperatures of about 150–160° C. The pressure at which the reaction takes place will be determined to a great extent by the reaction temperature used.

The reaction of the acetylenic carbinols with ethylene oxide requires slightly higher temperatures and pressures in order to promote the reaction at a reasonable rate. It is thus advantageous to react the carbinols at temperatures of about 150° C. and at pressures between about 150 to 200 p.s.i.g. when using triethylamine as a catalyst. Although higher and lower temperatures and pressures can be used depending upon the particular carbinol being reacted and the other reaction conditions such as the type and amount of catalyst being used, it is advantageous to react such ethylenic carbinols as 3-methyl-1-nonyn-3-ol at temperatures above 150° C. and at pressures above 200 p.s.i.g. since the reaction of such carbinols proceeds rather slowly at or below these temperatures and pressures.

To prepare the ethylene oxide adducts, the acetylenic glycol or carbinol is liquefied by melting and the catalyst added with stirring. No warming is required if the initial glycol or carbinol is a liquid. To this mixture is added liquid ethylene oxide with stirring, and the reaction concluded when the desired polyoxyethylene chain length is achieved. No solvents are necessary during the reaction, but inert solvents may be used when the initial acetylenic glycol or carbinol employed is moderately high melting (greater than 80° C.).

In adding the liquid ethylene oxide to the acetylenic glycol and the catalyst, care should be taken to avoid the presence of an excess of ethylene oxide in the reaction mixture since the reaction is a powerful exothermic one which might prove to be very hazardous. The danger of an uncontrollable reaction can be avoided by adding the ethylene oxide in a manner and at a rate such that it is absorbed as rapidly as it is introduced into the reaction mixture.

The condensation reaction between the acetylenic glycols or carbinols and ethylene oxide is a non-selective one and the progress of the reaction can be followed by various means to determine at which point the reaction is to be terminated. The reaction can be followed, for example, by observing the cloud point of the reaction mixture, by continuously weighing it, by observing changes in the refractive index, and the like. The reaction can be more advantageously followed by observing the cloud point which is more accurate in determining the average polyoxyethylene chain length during the course of the reaction. As the average polyoxyethylene chain length increases, the cloud point correspondingly increases. After the reaction has been stopped and the adduct isolated, an accurate determination of the average polyoxyethylene chain length can be made by determining the gain in weight of the resulting adduct over the original glycol or carbinol reacted and by a carbon, hydrogen analysis. Once it has been determined that a particular average polyoxyethylene chain length is obtained under set reaction conditions, the adducts can be reproduced without the necessity of following the reaction to determine at which point it should be terminated.

Generally the polyoxyethylene chain lengths corresponding to about 3 to 10 oxyethylene units are clear, amber-colored oils. Increasing the polyoxyethylene chain length to about 15 to 30 oxyethylene moieties increases the viscosity of the resultant aduct.

The following examples are illustrative of the preparation and properties of the ethylene oxide adducts useful as corrosion inhibitors according to this invention.

In the following two examples, ethylene oxide was reacted with 2,4,7,9-tetramethyl-5-decyne-4,7-diol using triethylamine as a catalyst to form an adduct having a molar ratio of 1:8.0 of glycol to ethylene oxide units. Low pressures were used in the first example, and atmospheric pressure employed during the second reaction.

EXAMPLE 1

*Adducts of 2,4,7,9-tetramethyl-5-decyne-4,7-diol*

*Low pressure method.*—To a one-gallon autoclave were added 904 g.(4.0 moles) of 2,4,7,9-tetramethyl-5-decyne-4,7-diol and 20 g. of triethylamine as a catalyst. After purging all lines in the autoclave system with nitrogen, the mixture was warmed at temperatures of 55° to 60° C., with stirring, until all of the glycol had melted. The nitrogen pressure in the autoclave was then adjusted to zero gauge pressure at 55° C., and 1231 g. (28.0 moles) of liquid ethylene oxide slowly added to the surface of the molten glycol, during which addition the temperature was maintained between 55° and 100° C. After the addition of about 75% of the total amount of ethylene oxide at 55° to 100° C., the absorption rate diminished and the pressure began to rise. The reaction temperature was then gradually lowered to about 25° to 40° C. to control the autoclave pressure and to allow the remainder of the ethylene oxide to be added at a pressure of 35–50 p.s.i.g.

The residual ethylene oxide in the lines was then blown into the autoclave with slight nitrogen pressure, the autoclave sealed, and the reaction mixture heated to 125° C. for about one hour, during which time a maximum pressure of 100 to 150 p.s.i.g. was generated. The resultant product was a mobile, light, orange-brown oil. The oil was cleansed of any unreacted ethylene oxide and triethylamine by vacuum topping at 120°–130° C./25 mm. The amine catalyst was removed from the product which altered its color to a light amber shade. If further purification is required, the product can be treated with several drops of concentrated hydrochloric acid, and decolorized with charcoal. The conversion to the desired adduct was 98.2% of theory, based on the ethylene oxide consumed.

EXAMPLE 2

*Adducts of 2,4,7,9-tetramethyl-5-decyne-4,7-diol*

*Atmospheric pressure method.*—This method was the same as the preceding low pressure method except that the liquid ethylene oxide was added at atmospheric pressure. The rate of the reaction at atmospheric pressure was found to be noticeably slower than at low to moderate pressures. By way of comparison, reactions concluded at atmospheric pressure generally required from three to five times as long as a stoichiometrically corresponding reaction carried out at low pressures.

Using substantially the same apparatus as described for the low pressure method of Example 1, 1231 g. (28.0 moles) of liquid ethylene oxide were added to a mixture containing 904 g. (4.0 moles) of 2,4,7,9-tetramethyl-5-decyne-7,9-diol and 20 g. of triethylamine. The reaction temperature was initially 55–75° C., and after the addition of between 2 to 3 moles of ethylene oxide per mole of glycol, the temperature was gradually increased to a maximum of 120–125° C. The reaction was discontinued when the reaction adduct contained a molar ratio of 1:8.0 glycol to ethylene oxide units.

To illustrate the ease of addition of varying molar amounts of ethylene oxide to the acetylenic glycols, Table I summarizes the conditions and results achieved when several ethylene oxide adducts were prepared with ratios of glycol to ethylene oxide units ranging from 1:4.0 to 1:30.0. In each case, the glycol was reacted with ethylene oxide using the low pressure method described above. Triethylamine was used as the catalyst.

TABLE I

*Adducts of 2,4,7,9-tetramethyl-5-decyne-4,7-diol*

| Moles of Glycol | Average Reaction Conditions | | | Grams of Ethylene Oxide | Ethylene Oxide Molar Ratio |
|---|---|---|---|---|---|
| | Pressure (p.s.i.) | Temp. (° C.) | Time (hrs.) | | |
| 0.5 | 35–158 | 42–151 | 4 | 200 | 1:4.0 |
| 4.0 | 25–125 | 25–135 | 4.5 | 2,110 | 1:6.8 |
| 4.0 | 32–130 | 28–125 | 4.75 | 2,270 | 1:7.8 |
| 0.5 | 37–80 | 30–160 | 4 | 309 | 1:9.0 |
| 0.5 | 40–280 | 72–160 | 9 | 477 | 1:16.2 |
| 0.45 | 30–255 | 25–240 | 2.5 | 312 | 1:30.0 |

EXAMPLE 3

*Adducts of 7,10-dimethyl-8-hexadecyne-7,10-diol*

To a liter autoclave was added a solution of 141 g. (0.5 mole) of 7,10-dimethyl-8-hexadecyne-7,10-diol dissolved in 160 ml. xylene. After adding 5 g. of triethylamine to the solution, the autoclave lines were flushed with nitrogen at 25 p.s.i.g., the nitrogen adjusted to zero gauge pressure, and the mixture warmed to about 55° to 60° C. At this temperature, 301 g. (6.8 moles) of liquid ethylene oxide were slowly added to the surface of the glycol solution, and the temperature slowly increased to about 100° C. After about 70% of the ethylene oxide had been added, the temperature was decreased to about 40° C. by cooling, and the balance of the ethylene oxide added.

Upon the addition of all the liquid ethylene oxide, the autoclave was closed, and the reaction mixture heated to 156° C., which temperature generated a maximum pressure of 285 p.s.i.g. The temperature was maintained for about an hour, or until there was no further pressure drop. The resultant adduct, after cooling, consisted of an amber oil which contained a ratio of 1:7.3 of glycol to oxyethylene moieties.

EXAMPLE 4

*Mixed adducts of 7,10-dimethyl-8-hexadecyne-7,10-diol and 3-methyl-1-nonyn-3-ol*

A mixture comprising about 84% by weight of 7,10-dimethyl-8-hexadecyne-7,10-diol and about 16% by weight of 3-methyl-1-nonyn-3-ol was prepared. Upon cooling, the glycol-carbinol mixture solidified to a light cream solid, which was used without further purification for the reaction with ethylene oxide.

The glycol-carbinol mixture was liquified by warming and 133.5 g. of the molten glycol-carbinol (corresponding to 0.4 mole glycol and 0.133 mole carbinol) transferred to a liter autoclave. After adding 5 g. of triethylamine, the autoclave was sealed and purged with nitrogen at 25 p.s.i.g., and the nitrogen pressure adjusted to zero gauge pressure. A total of 354 g. (8.04 moles) of liquid ethylene oxide were added to the reaction mixture in two stages.

In the first stage, 218 g. of ethylene oxide were added to the reaction mixture in the autoclave, and the entire charge was heated for five hours at an average temperature of 150° C. The pressure during this period varied from an optimum of 268 to a minimum of 231 p.s.i.g. and then remained essentially unchanged. The autoclave was then cooled to 25° to 30° C., and the remaining 136 g. of ethylene oxide added. After heating the charge for an additional five hours at 150° C., the autoclave was again cooled to room temperature, opened, and the product warmed to 120° C. to free it of unreacted ethylene oxide (88.5 g.). The product was vacuum topped at 120–150° C./25 mm. to eliminate the last traces of ethylene oxide and triethylamine, yielding 229 g. of a light amber oil which had a 1:10.4 glycol to ethylene oxide ratio.

EXAMPLE 5

*Adducts of 4,7-dimethyl-5-decyne-4,7-diol*

To a liter autoclave was added 99 g. (0.5 mole) of 4,7-dimethyl-5-decyne-4,7-diol and 10 g. of N,N-dimethyl aniline. After flushing out the autoclave lines with nitrogen, 315 g. of liquid ethylene oxide were weighed into the autoclave and the reaction mixture heated for five hours from 48° to 160° C., during which time the pressure varied from 56 to 530 p.s.i.g. Upon cooling to room temperature and venting unreacted ethylene oxide, the adduct was warmed to remove the last traces of ethylene oxide. The resultant product, on decolorization, was a light amber oil containing a ratio of 1:9.0 of glycol to oxyethylene moieties.

EXAMPLE 6

*Adducts of 2,5-diphenyl-3-hexyne-2,5-diol*

A solution of 133 g. (0.5 mole) of 2,5-diphenyl-3-hexyne-2,5-diol and 5 g. of triethylamine in 200 ml. of xylene was charged to a gallon autoclave, purged with nitrogen and then reacted with 290 g. of liquid ethylene oxide, using the low pressure method described in Example 1. Upon purification, the resultant adduct contained an average of 7-oxyethylene moieties per mole of glycol.

EXAMPLE 7

*Adducts of 3-methyl-1-nonyn-3-ol*

To a liter autoclave was added 100 g. (0.65 mole) of 3-methyl-1-nonyn-3-ol and 5 g. of triethylamine as a catalyst. After purging all lines in the autoclave system with nitrogen at 25 p.s.i.g., the nitrogen pressure was adjusted to zero gauge pressure, and 198 g. (4.5 moles) of liquid ethylene oxide slowly added to the surface of the molten carbinol at temperatures between 30° and 100° C. After the addition of about 75% of the total amount of ethylene oxide, the absorption rate diminished and the pressure began to rise. The reaction temperature was then gradually lowered to about 25° to 40° C. to control the autoclave pressure and to allow the remainder of ethylene oxide to be added at a pressure of about 50 p.s.i.g.

Following the addition of all of the ethylene oxide, the system was again purged with nitrogen, the autoclave sealed, and the reaction mixture heated to 151° C., or until a maximum pressure of 205 p.s.i.g. was generated. Upon cooling, the resultant product was a mobile, light orange-brown oil which was cleansed of any unreacted ethylene oxide and triethylamine by vacuum topping at 120–130° C./25 mm. The amine catalyst was removed from the product which altered its color to a light amber shade. If further purifcation is required or desired, the product may be treated with several drops of concentrated hydrochloric acid and decolorized with charcoal. The reaction product contained a molar ratio of 1:10.0 of carbinol to ethylene oxide units.

The other ethylene oxide adducts of acetylenic glycols and carbinols coming within the scope of this invention can be prepared in a similar manner to that described in detail in the above specific working examples.

The ethylene oxide adducts of acetylenic glycols and carbinols are advantageous corrosion inhibitors in aqueous solutions of acids, bases, and salts. The adducts are soluble in water at both high and low molecular weights and can advantageously be employed in aqueous corrosive systems over a large and useful concentration range.

This invention includes the discovery that the ethylene oxide adducts can be advantageously used in aqueous corrosive systems in admixture with themselves and in admixture with acetylenic glycols and carbinols. Included among the mixtures which can be used according to this invention are mixtures of the same parent acetylenic glycol or carbinol containing different oxyethylene chain lengths, mixtures of the ethylene oxide adducts of different acetylenic glycols and carbinols containing the same or different oxyethylene chain lengths, and mixtures of the ethylene oxide adducts of acetylenic glycols with the ethylene oxide adducts of acetylenic carbinols. The acetylenic glycols and carbinols can be used in admixture with various and different ethylene oxide adducts of acetylenic glycols or carbinols or mixtures thereof. The mixtures of the adducts themselves as well as the mixtures of the adducts with the acetylenic glycols and carbinols generally increase the anticorrosive action above what either adduct would do alone at the same concentrations and under the same conditions. Various advantageous mixtures are given below in the specific examples.

The ratio of the different adducts which can be used in admixture can be varied quite widely depending upon the extent of corrosion inhibition desired and the particular corrosive system in which it is employed as will be appreciated by those skilled in the art. Generally we have found that a ratio of about 1:1 is most suitable. The ratio of the mixtures containing the adducts and the acetylenic glycols and carbinols can also be varied quite widely and a similar 1:1 ratio has been found to be most suitable. The optimum ratio for the particular adducts or acetylenic carbinols and glycols in a particular corrosive medium can be established by routine experimentation by those skilled in the art.

The ethylene oxide adducts of acetylenic glycols and carbinols or mixtures thereof can be employed in corrosive aqueous solutions to inhibit corrosion over a relatively wide concentration range. The most effective corrosive inhibiting amount of the adducts will necessarily vary depending upon the particular corrosive agent to be inhibited, that is, acid, base or salt, the amounts present in the aqueous solutions, and also upon the particular metal upon which it is desired to inhibit corrosion. Generally, we have found that concentrations of the corrosive inhibiting adducts between 0.1 and 1 percent by weight of the corrosive solution are effective corrosive inhibiting concentrations. Higher and lower concentrations can also be used if desired or if found to be advantageous in a particular corrosive system.

The ethylene oxide adducts of acetylenic glycols and carbinols as described herein are effective corrosion inhibitors for various metals of common construction including aluminum, iron, zinc, steel, and their alloys.

The ethylene oxide adducts and the mixtures disclosed herein are advantageous corrosion inhibiting materials. They are soluble in water and can thus be used in advantageously high concentrations with both high and low molecular weight compounds. The corrosion inhibitors of this invention can thus be employed in aqueous corrosive systems over a large and useful concentration range. The ethylene oxide adducts and mixtures remain dissolved in the aqueous system and as a result do not contaminate the metal being subjected to the corrosive solution.

The following examples illustrate the corrosion inhibition properties of the acetylenic adducts and mixtures thereof with acetylenic glycols and carbinols on various metals and alloys. The percent inhibition is calculated by dividing the weight of the original coupon less the weight loss of the coupon after immersion by the weight of the original coupon and multiplying by 100.

Aluminum alloy coupons composed of 93.4 percent aluminum, 4.5 percent copper, 1.5 percent magnesium, and 0.6 percent manganese were thoroughly cleaned with trichloroethylene, weighed, and immersed in an aqueous solution containing 5 percent by weight hydrochloric acid and the following listed adducts and mixtures at a temperature of about 40° C. The concentrations of the inhibitors are given as percent by weight. After the coupons had remained immersed in the acid solution for periods of 1 and 2 hours they were removed, reweighed, and percent inhibition calculated after both the first and second hour.

| Inhibitor | Percent Inhibition, 1 Hour | Percent Inhibition, 2 Hours |
|---|---|---|
| 0.10% 3-methyl-1-nonyn-3-ol ethylene oxide adduct containing an average of 10 oxyethylene units | 98.5 | 97.2 |
| 0.05% of equal amounts of 3-methyl-1-nonyn-3-ol and 3-methyl-1-nonyn-3-ol ethylene oxide adduct containing an average of 10 oxyethylene units | 98.5 | 95.5 |
| 0.10% of equal amounts of 3-methyl-1-nonyn-3-ol and 3-methyl-1-nonyn-3-ol ethylene oxide adduct containing an average of 10 oxyethylene units | 98.2 | 97.4 |
| 0.20% of equal amounts of 3-methyl-1-nonyn-3-ol and 3-methyl-1-nonyn-3-ol ethylene oxide adduct containing an average of 10 oxyethylene units | 98.5 | 97.0 |
| 0.10% of equal amounts of 2,5-diphenyl-3-hexyne-2,5-diol and 2,5-diphenyl-3-hexyne-2,5-diol ethylene oxide adduct containing an average of 15 oxyethylene units | 86.8 | 78.8 |

Mild steel coupons were thoroughly cleaned with trichloroethylene, weighed, and immersed in aqueous solutions containing 15 percent by weight hydrochloric acid and the following listed adducts and mixtures at a temperature of about 50° C. After the coupons had remained immersed in the acid solution for a period of approximately 5 hours they were removed and reweighed and the percent inhibition calculated. The percent concentrations are by weight.

| Inhibitor | Percent Inhibition |
|---|---|
| 0.10% 2,4,7,9-tetramethyl-5-decyne-4,7-diol ethylene oxide adduct containing an average of 16 oxyethylene units | 84.7 |
| 0.10% 2,4,7,9-tetramethyl-5-decyne-4,7-diol ethylene oxide adduct containing an average of 9 oxyethylene units | 24.2 |
| 0.10% 2,4,7,9-tetramethyl-5-decyne-4,7-diol ethylene oxide adduct containing an average of 4 oxyethylene units | 41.9 |
| 0.10% 4,7-dimethyl-5-decyne-4,7-diol ethylene oxide adduct containing an average of 9 oxyethylene units | 75.8 |
| 0.10% 3-methyl-1-nonyn-3-ol ethylene oxide adduct containing an average of 10 oxyethylene units | 45.2 |
| 0.10% 3-methyl-1-nonyn-3-ol ethylene oxide adduct containing an average of 3.5 oxyethylene units | 38.8 |
| 0.20% of equal amounts of 3-methyl-1-butyne-3-ol and 2,4,7,9-tetramethyl-5-decyne-4,7-diol ethylene oxide adduct containing an average of 16 oxyethylene units | 96.0 |
| 0.20% of equal amounts of 3-methyl-1-butyne-3-ol and 4,7-dimethyl-5-decyne-4,7-diol ethylene oxide adduct containing an average of 9 oxyethylene units | 95.2 |
| 0.05% of equal amounts of 3-methyl-1-nonyn-3-ol and 3-methyl-1-nonyn-3-ol ethylene oxide adduct containing an average of 10 oxyethylene units | 41.7 |
| 0.10% of equal amounts of 3-methyl-1-nonyn-3-ol and 3-methyl-1-nonyn-3-ol ethylene oxide adduct containing an average of 10 oxyethylene units | 48.5 |
| 0.20% of equal amounts of 3-methyl-1-nonyn-3-ol and 3-methyl-1-nonyn-3-ol ethylene oxide adduct containing an average of 10 oxyethylene units | 57.3 |
| 0.10% of equal amounts of 3-methyl-1-nonyn-3-ol and 3-methyl-1-nonyn-3-ol ethylene oxide adduct containing an average of 3.5 oxyethylene units | 40.7 |

Mild steel coupons were thoroughly cleaned with trichloroethylene, weighed, and immersed in an aqueous solution containing 15 percent by weight sulfuric acid and the following listed adducts and mixtures at a temperature of 86° C. The percent concentration of the inhibitors is given in percent by weight. After the coupons had remained immersed in the acid for a period of approximately 5 hours they were removed and reweighed and the percent inhibition calculated.

| Inhibitor | Percent Inhibition |
|---|---|
| 0.10% 2,4,7,9-tetramethyl-5-decyne-4,7-diol ethylene oxide adduct containing an average of 4 oxyethylene units | 64.7 |
| 0.10% 2,4,7,9-tetramethyl-5-decyne-4,7-diol ethylene oxide adduct containing an average of 9 oxyethylene units | 43.4 |
| 0.10% 2,4,7,9-tetramethyl-5-decyne-4,7-diol ethylene oxide adduct containing an average of 16 oxyethylene units | 10.5 |
| 0.05% of equal amounts of 3-methyl-1-nonyn-3-ol and 3-methyl-1-nonyn-3-ol ethylene oxide adduct containing an average of 10 oxyethylene units | 96.1 |
| 0.10% of equal amounts of 3-methyl-1-nonyn-3-ol and 3-methyl-1-nonyn-3-ol ethylene oxide adduct containing an average of 10 oxyethylene units | 96.2 |
| 0.20% of equal amounts of 3-methyl-1-nonyn-3-ol and 3-methyl-1-nonyn-3-ol ethylene oxide adduct containing an average of 10 oxyethylene units | 95.4 |
| 0.10% of equal amounts of 2,4,7,9-tetramethyl-5-decyne-4,7-diol and 2,4,7,9-tetramethyl-5-decyne-4,7-diol ethylene oxide adduct containing an average of 10 oxyethylene units | 58.0 |

Zinc coupons were thoroughly cleaned by boiling them in trichloroethylene for about 30 minutes. The zinc strips were then rinsed, rubbed with cotton under acetone and then under running water, dipped in acetone, and air-dried. The zinc strips were then weighed and immersed in 1N hydrochloric acid containing the following listed adducts and mixtures at room temperature. The concentrations of the inhibitors are given as percent by weight. After the coupons had remained immersed in the aqueous acid solution for a period of 4 hours they were removed, reweighed, and the percent inhibition calculated.

| Inhibitor | Percent Inhibition |
|---|---|
| 0.2% 3-methyl-1-nonyn-3-ol ethylene oxide adduct containing an average of 10 oxyethylene units | 31.0 |
| 1.0% 3-methyl-1-nonyn-3-ol ethylene oxide adduct containing an average of 10 oxyethylene units | 13.0 |
| 1.0% of equal amounts of 2,5-diphenyl-3-hexyne-2,5-diol ethylene oxide adduct containing an average of 15 oxyethylene units and 3-methyl-1-nonyn-3-ol ethylene oxide adduct containing an average of 10 oxyethylene units | 99.6 |
| 1.0% of equal amounts of 3-methyl-1-nonyn-3-ol and 3-methyl-1-nonyn-3-ol ethylene oxide adduct containing an average of 10 oxyethylene units | 97.0 |
| 0.2% of equal amounts of 3-methyl-1-nonyn-3-ol and 3-methyl-1-nonyn-3-ol ethylene oxide adduct containing an average of 10 oxyethylene units | 40.0 |
| 0.2% 4-ethyl-1-octyne-3-ol ethylene oxide adduct containing an average of 3 oxyethylene units | 18.0 |
| 1.0% 4-ethyl-1-octyne-3-ol ethylene oxide adduct containing an average of 3 oxyethylene units | 51.0 |
| 0.2% 4-ethyl-1-octyne-3-ol ethylene oxide adduct containing an average of 13 oxyethylene units | 81.0 |
| 1.0% 4-ethyl-1-octyne-3-ol ethylene oxide adduct containing an average of 13 oxyethylene units | 90.0 |

Zinc coupons were cleaned and weighed in the same manner as the zinc coupons described above and immersed in a 1N hydrochloric acid solution containing 20 percent by weight calcium chloride and the following listed adducts and mixtures at room temperature. The concentrations of the inhibitors are given as percent by weight. After the coupons had remained immersed in the 1N hydrochloric acid solution containing 20 percent calcium chloride for a period of 2 hours they were removed, reweighed, and the percent inhibition calculated.

| Inhibitor | Percent Inhibition |
|---|---|
| 1.0% 2,5-diphenyl-3-hexyne-2,5-diol ethylene oxide adduct containing an average of 15 oxyethylene units | 64.0 |
| 1.0% 3-methyl-1-nonyn-3-ol ethylene oxide adduct containing an average of 10 oxyethylene units | 50.0 |
| 1.0% of equal amounts of 2,5-diphenyl-3-hexyne-2,5-diol ethylene oxide adduct containing an average of 15 oxyethylene units and 3-methyl-1-nonyn-3-ol ethylene oxide adduct containing an average of 10 oxyethylene units | 98.0 |

This application is a continuation-in-part of our copending application Serial No. 731,608, filed April 29, 1958, now abandoned.

We claim:

1. An aqueous solution consisting essentially of water, an agent which is normally corrosive to metals, said agent being selected from the group consisting of acids, bases, and salts, and a corrosion inhibiting amount of at least one member of the group consisting of ethylene oxide adducts of acetylenic glycols having the formula

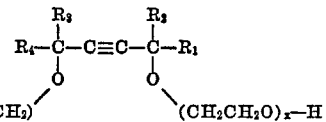

in which $R_1$, $R_2$, $R_3$, and $R_4$ are members selected from the group consisting of alkyl, cycloalkyl, aryl, and aralkyl radicals and hydrogen and where $R_1$, $R_2$, $R_3$, and $R_4$ contain a total of at least seven carbon atoms, and $x$ and $y$ are integers totaling an average of between 3 and 25 and ethylene oxide adducts of acetylenic carbinols having the formula

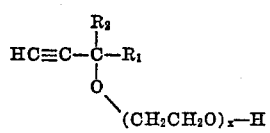

in which $R_1$ and $R_2$ are members selected from the group consisting of alkyl, cycloalkyl, aryl, and aralkyl radicals and hydrogen and where $R_1$ and $R_2$ contain a total of at least three carbon atoms, and $x$ is an integer averaging between 3 and 30.

2. An aqueous solution consisting essentially of water, an agent which is normally corrosive to metals, said agent being selected from the group consisting of acids, bases, and salts, and from about 0.1 to about 1 percent by weight of at least one member of the group consisting of ethylene oxide adducts of acetylenic glycols having the formula

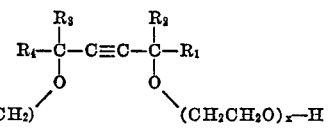

in which $R_1$, $R_2$, $R_3$, and $R_4$ are members selected from the group consisting of alkyl, cycloalkyl, aryl, and aralkyl radicals and hydrogen and where $R_1$, $R_2$, $R_3$, and $R_4$ contain a total of at least seven carbon atoms, and $x$ and $y$ are integers totaling an average of between 3 and 25 and ethylene oxide adducts of acetylenic carbinols having the formula

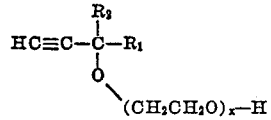

in which $R_1$ and $R_2$ are members selected from the group consisting of alkyl, cycloalkyl, aryl, and aralkyl radicals and hydrogen and where $R_1$ and $R_2$ contain a total of at least three carbon atoms, and $x$ is an integer averaging between 3 and 30.

3. An aqueous solution consisting essentially of water, an agent which is normally corrosive to metals, said agent being selected from the group consisting of acids, bases, and salts, and from about 0.1 to about 1 percent by weight of an ethylene oxide adduct of 2,4,7,9-tetramethyl-5-decyne-4,7-diol containing an average of between 3 and 25 oxyethylene moieties per mole of 2,4,7,9-tetramethyl-5-decyne-4,7-diol.

4. An aqueous solution consisting essentially of water, at least one agent which is normally corrosive to metals, said agent being selected from the group consisting of acids, bases, and salts, and a corrosion inhibiting amount of a mixture of (A) an acetylenic compound selected from the group consisting of an acetylenic glycol and an acetylenic carbinol and (B) an ethylene oxide adduct of 2,4,7,9-tetramethyl-5-decyne-4,7-diol containing an average of between 3 and 25 oxyethylene moieties per mole of 2,4,7,9-tetramethyl-5-decyne-4,7-diol, the amounts of said acetylenic compound and said ethylene oxide adduct being about equal.

5. An aqueous solution consisting essentially of water, at least one agent which is normally corrosive to metals, said agent being selected from the group consisting of acids, bases, and salts, and a corrosion inhibiting amount of a mixture of (A) an acetylenic compound selected from the group consisting of an acetylenic glycol and an acetylenic carbinol and (B) an ethylene oxide adduct of 3-methyl-1-nonoyn-3-ol containing an average of between 3 and 30 oxyethylene moieties per mole of 3-methyl-1-nonoyn-3-ol, the amounts of said acetylenic compound and said ethylene oxide adduct being about equal.

6. An aqueous solution consisting essentially of water, at least one agent which is normally corrosive to metals, said agent being selected from the group consisting of acids, bases, and salts and a corrosion inhibiting amount of a mixture of (A) 3-methyl-1-nonyn-3-ol and (B) an ethylene oxide adduct of 3-methyl-1-nonyn-3-ol containing an average of between 3 and 30 oxyethylene moieties per mole of 3-methyl-1-nonyn-3-ol, and amounts of 3-methyl-1-nonyn-3-ol and said ethylene oxide adduct being about equal.

References Cited in the file of this patent

UNITED STATES PATENTS

| | | |
|---|---|---|
| 2,799,649 | Caldwell et al. | July 16, 1957 |
| 2,802,878 | Monroe et al. | Aug. 13, 1957 |
| 2,806,067 | Monroe et al | Sept. 10, 1957 |
| 2,899,391 | Mayhew | Aug. 11, 1959 |

OTHER REFERENCES

Nazarov et al.: Chem. Abs., vol. 35, cols. 4733 to 4735, 1941.

Johnson: The Chemistry of Acetylenic Compounds. Vol. 1, The Acetylenic Alcohols, pp. 218–219 and 232–235, London. Edward Arnold and Co., 1946.

---

UNITED STATES PATENT OFFICE
CERTIFICATION OF CORRECTION

Patent No. 3,004,925     October 17, 1961

Robert J. Burch et al.

It is hereby certified that error appears in the above numbered patent requiring correction and that the said Letters Patent should read as corrected below.

Column 1, line 31, for "and y integers" read -- and y are integers --; column 2, line 56, for "presure" read -- pressure --; line 57, for "tetraethylamine" read -- triethylamine --; column 4, line 7, for "aduct" read -- adduct --; column 6, line 58, for "purifcation" read -- purification --; column 11, line 13, for "-nonoyn-" read -- -nonyn- --; column 12, line 4, for "and" read -- the --.

Signed and sealed this 10th day of April 1962.

Attest:

ERNEST W. SWIDER
Attesting Officer

DAVID L. LADD
Commissioner of Patents

UNITED STATES PATENT OFFICE
CERTIFICATION OF CORRECTION

Patent No. 3,004,925                    October 17, 1961

Robert J. Burch et al.

It is hereby certified that error appears in the above numbered patent requiring correction and that the said Letters Patent should read as corrected below.

Column 1, line 31, for "and y integers" read -- and y are integers --; column 2, line 56, for "pressure" read -- pressure --; line 57, for "tetraethylamine" read -- triethylamine --; column 4, line 7, for "aduct" read -- adduct --; column 6, line 58, for "purifcation" read -- purification --; column 11, line 13, for "-nonoyn-" read -- -nonyn- --; column 12, line 4, for "and" read -- the --.

Signed and sealed this 10th day of April 1962.

Attest:

ERNEST W. SWIDER                            DAVID L. LADD  
Attesting Officer                              Commissioner of Patents